(12) United States Patent
Funck

(10) Patent No.: US 6,422,131 B1
(45) Date of Patent: Jul. 23, 2002

(54) HIGH PRESSURE PISTON SEAL

(75) Inventor: Theodor Funck, Gottingen (DE)

(73) Assignee: Resonic Instruments AG (DE)

( * ) Notice: Subject to any disclaimer, the term of this patent is extended or adjusted under 35 U.S.C. 154(b) by 0 days.

(21) Appl. No.: 09/380,721

(22) PCT Filed: Mar. 4, 1998

(86) PCT No.: PCT/EP98/01211

§ 371 (c)(1),
(2), (4) Date: Nov. 16, 1999

(87) PCT Pub. No.: WO98/39584

PCT Pub. Date: Sep. 11, 1998

(30) Foreign Application Priority Data

Mar. 5, 1997 (DE) ......................... 197 08 951

(51) Int. Cl.⁷ .................................. F16J 1/06
(52) U.S. Cl. ......................... 92/205; 277/470
(58) Field of Search ........................ 92/205; 277/468, 277/470

(56) References Cited

U.S. PATENT DOCUMENTS

| 2,298,584 | A | * | 10/1942 | Onions | 277/468 |
| 2,392,123 | A | * | 1/1946 | De La Roza | 92/205 |
| 2,844,421 | A | | 7/1958 | Hayman | |
| 3,169,455 | A | * | 2/1965 | Hoffman | 92/205 |
| 3,540,746 | A | | 11/1970 | Jepsen | |
| 3,663,024 | A | | 5/1972 | Traub | |
| 3,999,767 | A | * | 12/1976 | Sievenpiper | 277/468 |
| 4,020,750 | A | * | 5/1977 | Friemuth et al. | 92/205 |
| 4,566,703 | A | * | 1/1986 | Zitting | 277/468 |
| 4,712,769 | A | * | 12/1987 | Johnson | 277/500 |

FOREIGN PATENT DOCUMENTS

| DE | 966318 | 7/1957 |
| DE | 1901274 | 7/1970 |
| DE | 2613541 | 10/1977 |
| DE | 3727430 | 2/1981 |
| DE | 4140833 | 11/1982 |
| DE | 3124661 | 1/1983 |
| DE | 3315050 | 11/1983 |
| DE | 3419775 | 11/1985 |
| DE | 3623928 | 1/1988 |
| DE | 4008901 | 5/1991 |
| DE | 4411006 | 12/1994 |
| EP | 0140052 | 5/1985 |
| EP | 0261293 | 3/1988 |

OTHER PUBLICATIONS

Parker–Pradifa GmbH, Dichtungshandbuch (Sealing Handbook),pp. 4–11, 14–15, 26–27, 48–54, 71, 74–75, 84–85.

J. Paauwe, I.L. Spain: "High Pressure Components in High Pressure Technology", vol. I, Marcel Debber Inc., 1977, pp. 83–94.

J.M. Edmiston, J. Paauwe, I.L. Spain: "Pumps and Compressors in High Pressure Technology", vol. I, Marcel Debber Inc., 1977, pp. 175–184.

* cited by examiner

Primary Examiner—F. Daniel Lopez
(74) Attorney, Agent, or Firm—Baker Botts LLP

(57) ABSTRACT

In a piston pressure device with a sealing device (10) for sealing between spaces of different pressure that includes an elastomer (12) as a first component and a material plastically deformable under pressure as a second component, whereby the components ensure sealing at various pressure differences, a piston (30) and a piston shaft (20), the piston (30) is axially shiftable in relation to the piston shaft (20) and the sealing device (10) is arranged form-closed in a recess between the piston (30) and the piston shaft (20).

5 Claims, 2 Drawing Sheets

Figure 1:
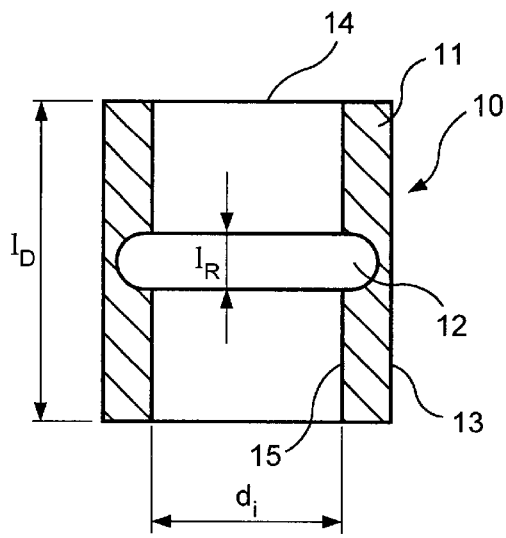

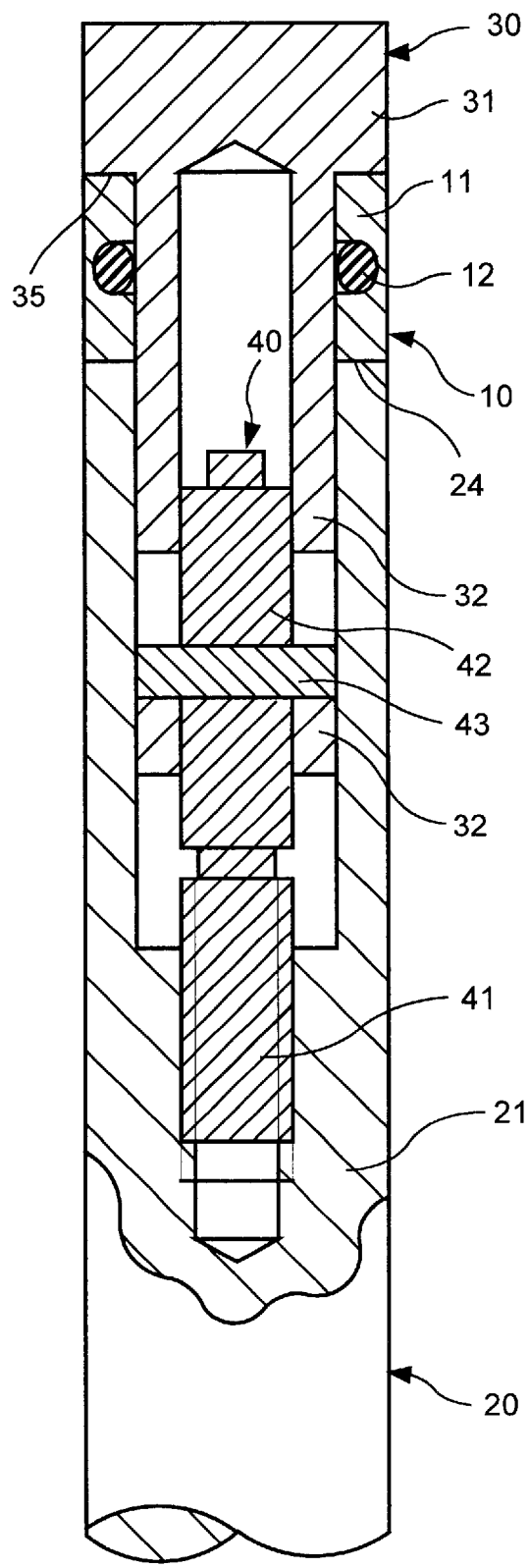
F I G. 4

HIGH PRESSURE PISTON SEAL

The invention relates to devices for gas-tight and fluid-tight separation of different spaces, in particular piston pressure devices.

To generate high pressure for mechanical work operations or for experimental purposes, piston arrangements are commonly used in which, through mechanical forward thrust of a piston in a hydraulic fluid, pressure is created and transmitted to the control element that is to be actuated by suitable means (eg high-pressure line). For effective build-up of pressure and to maintain pressure stability, the piston must be sealed off from the wall of the piston vessel (cylinder) for the hydraulic fluid. Here it is necessary that the sealing, even through the effect of the working pressure, should not let any hydraulic fluid out of the piston compartment into the outer compartment or into the sealing. Hydraulic fluids of high viscosity, eg oil and glycerin, are in widespread use for generating high pressure. The high viscosity of these hydraulic fluids makes it possible to produce effective sealings from elastomers with relatively little effort.

The use of high-viscosity pressure media in high-pressure devices simplifies the sealing of the system, but the disadvantage is that filling and venting the system is difficult and time-consuming. One problem is the avoidance of gas pockets in the high-pressure system, especially in engineering process applications with high demands for stability.

Physical engineering or chemical engineering processes may require pressure fluctuations to be less than 1/100 at.

Low-viscosity hydraulic fluids like ethanol and petroleum ether are known as suitable, clean and non-toxic pressure fluids. The disadvantage of low-viscosity hydraulic fluids, however, is that they generally have a low boiling point, so it is possible for vapor to form in the piston region. Furthermore, it is more difficult, especially in high-pressure applications, to produce effective sealing with low-viscosity hydraulic fluids.

In the case of high-pressure devices for work apparatus (eg hydraulic excavators) with which especially high regulating forces have to be produced, the operation of hydraulic pistons with armored sealing is familiar. Sealing of this kind is often produced as a combination of elastic and plastic elements. For example, it consists of a plastic that, through contact with the wall and at sufficiently high pressure, ensures sealing, and of a helical spring that is partly enclosed by this plastic and produces sufficiently high contact pressure for sealing at low pressure. At high pressure the direct effect of the pressure medium on the plastic sealing must produce the sufficiently high contact pressure. Sealing armored with spring elements exhibits decisive drawbacks. In the open helical spring region it is easy for air occlusions to form, which can lead to disturbances in the build-up of pressure when filling the pressure system (hydraulic system) and in later operation. Venting the sealing is only possible within time limits and involves considerable effort. Furthermore, spring armored sealings are restricted to certain minimum sizes (no possibility of miniaturization). Corrosive effects can appear on the armoring. Finally there is the possibility of the plastic being damaged by the spring armoring at high pressure ($\geq 100$ at), or of irreversible plastic deformation of the spring at very high pressure.

Conventional sealing devices also exhibit the following disadvantages. In the case of fluid sealings, leaks for gases will appear. This is problematic for the event that a gas is released in the hydraulic fluid or the hydraulic fluid is of low viscosity. With conventional pressure devices this means that gases exit into the sealing or even into the outer compartment. A further problem is that with conventional pressure devices there may be a fluid film to reduce friction between the sealing and the cylinder wall. This fluid film means in turn a change in the amount of hydraulic fluid and thus inaccuracy and instability in pressure generation. Numerous pressure devices are also intended for operation with standard hydraulic fluids. Consequently use of such sealings is not possible in compression measurements on random fluid samples with, possibly, unfavorable chemical properties for the sealings. Further disadvantages of conventional pressure devices are their lack of miniaturization capability (structure too complex) and the formation of gas occlusions in the packing. Contamination of the sealing by gases or fluids from the pressure medium that is used also leads to impurities in subsequent operation with other pressure media.

Sealings are also known that consist of an elastically and a plastically deformable component (see DE-OS 33 15 050 for example). Here, at low pressure, the plastically deformable component is pressed against the cylinder wall through the effect of the elastically deformable component. The plastically deformable component is also subjected to the pressure of the directly contacting pressure medium, whereby at higher pressure sufficiently high contact pressure is to be ensured against the cylinder wall that is to be sealed. Seeing as the plastically deformable component is in direct contact with the fluid over a large surface and the edges of the plastically deformable component against the cylinder wall or the piston are exposed to the pressure medium, this can penetrate into the packing. That makes this kind of sealing unsuitable for accurate and reproducible pressure settings in the high-pressure region and for simple venting of the packing.

Piston cylinder configurations with pretensioned sealing elements are known from DE-OS-1 901 247, DE-OS-40 08 901 and DE-OS-33 15 050.

The object of the invention is to propose an improved piston pressure device that is fluid-tight and gas-tight, that allows creation of highly stable pressure in the sealed space and whose effectiveness is independent of the viscosity of adjacent fluids.

This purpose is solved by a piston pressure device with the features of patent claim 1. Advantageous embodiments of the invention are defined in the dependent claims.

The invention is based on the idea of a piston pressure device in which a piston is anchored so as to be axially movable on a piston rod, whereby a recess for form-closed holding of a sealing device is created between the facing ends of the piston and piston rod. In the radial direction the recess is covered by a cylinder wall. The sealing device, primarily an elastic component of the sealing device, is largely protected by the piston against direct contact with the pressure medium. Nevertheless, the compressive forces of the pressure medium on the face end of the piston can be transmitted to the sealing device because of the axial motion of the piston referred to the piston rod. The result is compression of the sealing device in the recess, pressing it against the cylinder wall.

The outer diameter of the piston is matched to the inner diameter of the cylinder in such a way that axial mobility of the piston in the cylinder is ensured in all operating states of the piston pressure device. The formation of a fit between the piston and the cylinder means that the pressure exercised by the pressure medium on the piston is essentially created on the face end of the piston. Although pressure medium is able to penetrate between the piston and the cylinder wall, it is of a small and reproducible amount. Further penetration of the pressure medium into the sealing device is virtually excluded, however, compared to conventional piston pressure devices, because the sealing device is not immediately adjacent to the pressure medium (with the exception of the residual, negligible gap through the fit between the piston and the cylinder).

The sealing device is preferably a pressure-activated sealing device containing an elastomer and a material that is plastically deformable under pressure. The elastomer is at least in part enclosed by the deformable material. The elastomer is preferably formed of a synthetic rubber and the material deforming under pressure of a plastomer, preferably polytetrafluorethylene (PTFE), or tetrafluoroethylene copolymers. The components of the sealing device interact as follows to form the pressure-activated packing.

When there is a pressure difference, equal to or somewhat greater than zero, between two adjacent spaces separated by the sealing device (eg inner and outer compartments of a piston pressure device), the elastomer produces sealing. For this purpose the elastomer is selected with a certain Shore hardness and pretensioned so that sufficiently high elastic pressure is exerted on an adjacent wall (eg piston cylinder wall) to produce the required tightness. In this state the shape elasticity of the elastomer is utilized for sealing, while the material deformable under pressure does not contribute to creating the elastic pressure against the wall. Differing from the properties of conventional spring armorings, the elastomer has a positive compressibility characteristic, ie it is easily deformable and elastic at slight pressure and non-deformable at high pressure.

As soon as the pressure difference between the spaces increases (eg through mechanical actuation of a piston device fitted with the sealing device), the sealing device is compressed. Since the compressibility of the first component (the elastomer) is slight, the increasing pressure difference, with suitable transmission of the compressive forces to the sealing device, produces deformation of the second component (socalled Bridgeman effect). This deformation leads to gas-tight and fluid-tight contact between the limiting wall and the deformable component, and in particular to occlusion of all and any unevenness on the wall. The deformable material possesses as low as possible a coefficient of friction to create a wiping dry seal. This requirement is also satisfied by PTFE or tetrafluoroethylene copolymers.

The sealing device is preferably of a shape that, depending on pressure, ensures an optimal seal by one of the components. For this purpose the sealing device is formed of a solid of the material deformable under pressure in which the elastomer is embedded at least in part. The elastomer is arranged in the sealing device so that there is no direct contact with a vessel wall that is to be sealed. Instead the elastomer is separated from the surface of the wall by the material deformable under pressure. In use of the invention in a piston pressure device, the body of the sealing device preferably takes the form of a cylindrical sleeve of the material deformable under pressure, in which an elastomer ring is axial-symmetrically embedded.

The piston pressure device according to the invention contains in a piston casing a piston shaft with a piston that is linked to the piston shaft so as to be axially mobile by a means of anchoring. Arranged shell-like in the recess between the piston and the piston shaft is the sealing device, which is pretensioned when the piston starts to operate and is pressed against the wall of the piston casing as pressure builds up.

Figure 2:
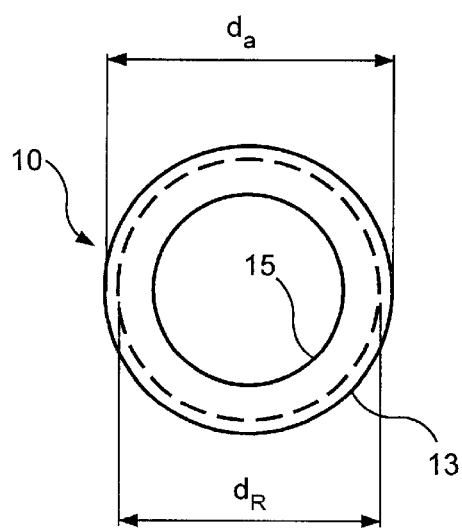
Figure 3A:
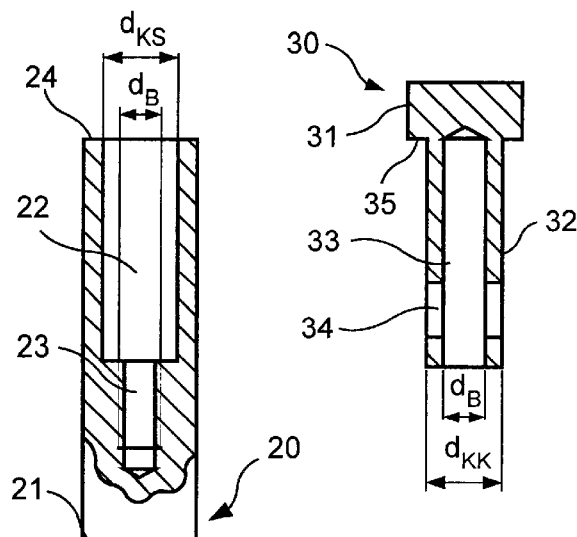
Figure 3B:
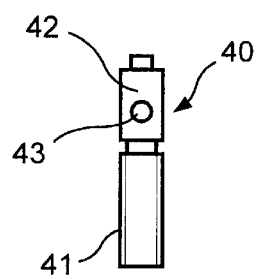
Figure 3C:
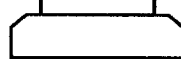

Embodiments of the invention are described in what follows with reference to the attached drawings, which show:

FIG. 1 a partial side section of the plastically deformable part of a sealing device according to the invention, FIG. 2 a plan view of the plastically deformable part of the sealing device according to FIG. 1, FIGS. 3a–3c partial side sections of parts of the piston pressure device (disassembled) according to the invention, and FIG. 4 a sectional view of the piston pressure device when assembled.

FIGS. 1 and 2 show a sealing device for use in a piston pressure device according to the invention. The composition of the pressure-activated sealing is not restricted to this application or the materials named as examples however, it can also be used in other sealing devices (especially vacuum-tight sealings, etc).

The sealing device is preferably provided on a pressurized piston in a recess opening towards the piston wall (cylinder wall) whose volume is variable under pressure and in which the sealing device is separated from the pressure medium by the piston. The sealing device is designed so that its volume, in the absence of or under slight pressure, fills the volume of the recess form-closed, whereby in this state the seal is produced by the effect of the elastomer component. If only one elastomer ring and at least one plastomer ring were arranged next to one another in the recess, eg in the form of an annular tee-slot, and in contact with the piston wall, then, because the piston is mobile along the wall, the elastomer ring would be damaged at high pressure because of the friction against the piston wall, eg through extrusion into the gap between piston and cylinder. Therefore the invention provides for separation of the elastomer from the piston wall by a layer of the deformable material (plastomer). In this way the sealing device can be formed as a ring sealing consisting of an arrangement of two plastomer rings with an elastomer ring (or support ring) in between, where the elastomer ring has a smaller outer diameter than the plastomer rings and forms a bridge between the plastomer rings that separates the elastomer ring from the piston wall. The thickness of the plastomer bridge is thus essentially equal to the difference between the outer diameters of the plastomer and elastomer rings.

The design in FIGS. 1 and 2 is specially matched to the construction of the piston pressure device described below with reference to FIG. 3. The sealing device 10 comprises a sealing body 11 (eg of PTFE) in the form of a cylindrical sleeve (sectional and hatched). Embedded axial-symmetrically in the sealing body 11 is an elastomer ring 12. The sealing body 11 basically takes the form of a hollow cylinder with height $l_D$, inner diameter $d_i$ and outer diameter $d_a$. The cylinder height (sleeve length) $l_D$ is matched to the width of a piston head groove in the unloaded state and selected to provide a sufficiently large outer surface 13 in relation to the piston wall. The dimension $l_D$ is preferably at least three times the thickness $l_R$ of the elastomer ring 12. The outer sleeve diameter $d_a$, in the unloaded state of the sealing device 10, is slightly larger than the inner diameter of the piston casing (cylinder). Together with the elastomer ring of suitably selected outer diameter $d_R$, the result is a gas-tight and fluid-tight seal in the unloaded state of the sealing device 10. The inner diameter $d_i$ of the sealing body is correspondingly slightly smaller than the outer diameter of that part of the piston intended to hold the sealing device. Seeing as the sealing device 10 executes no or only minimal motion in relation to the piston, it is possible that the inner diameter of the elastomer ring 12 be essentially the same as the inner diameter $d_i$ of the sealing body 11. In contrast, the outer diameter $d_R$ of the elastomer ring 12 is slightly smaller than the outer diameter $d_a$ of the sealing body 11 in order to create space between the upper and lower parts of the sleeve in FIG. 1 for a bridge to separate the elastomer ring 12 from the piston wall. Consequently the sealing device according to the invention has, in relation to the piston wall to be sealed, a closed surface 13 of the material deformable under pressure (plastomer, eg PTFE). Thus, in every phase of pressure application, a gas-tight and fluid-tight seal and a wiping dry sealing is ensured in movement of the piston. The advantage of the plastomer bridge or membrane is that in this region there is first a sealing effect when pressure is applied. This avoids extrusion of the plastomer material at unwanted points.

For the elastomer material it is possible to use a synthetic rubber like Perbunan (registered trademark) or Viton (registered trademark) that possesses suitable elasticity and compression properties. An advantage of the complete separation of the elastomer from the hydraulic fluid is that the elastomer does not have to selected for special resistance to the hydraulic fluid. This considerably expands the range of use of the sealing device.

FIG. 3 shows the structure of a piston pressure device (without cylinder) for use with the sealing device. It consists of a piston rod 21, a piston 30 (or piston head) and a means of anchoring 40 for axial attachment of the piston 30 to the piston shaft 20.

The piston shaft 20 comprises a piston rod 21, on whose piston end 24 there is a hole 22 to hold the piston 30 and a threaded part 23 for attachment of the means of anchoring 40 (see below). The inner diameter $d_{KS}$ of the hole 22 is essentially the same as the outer diameter $d_{KK}$ of the piston base 32. The threaded part 23 is matched to the thread 41 of the means of anchoring 40.

The piston 30 comprises a face end 31 and a piston base 32 for insertion in the hole 22 of the piston shaft 20. The piston head base 32 has an inner hole 33 to hold part of the means of anchoring 40 and a radial recess 34 for interworking with a stop 43 of the anchoring head 42. The stop 43 is formed, for example, of a radially extending pin whose length is smaller than the outer diameter $d_{KK}$ of the piston head base 32 and greater than the diameter $d_B$ of the hole 33 in the piston base 32.

The parts of the piston pressure device are assembled so that the piston 30 with the sealing device and the means of anchoring 40 are inserted into the hole 22 of the piston shaft 20 and screwed tight to the threaded part 23 until the sealing device, especially the elastomer ring 12, is pretensioned, so that a gas-tight seal is formed in the absence of pressure. Since the recess 34 of the piston base 32 in axial direction forms an oblong slot, the piston 30 is mobile in an axial direction in relation to the piston shaft 20. Thus the compressive force is exercised from the piston rod through the sealing to the piston head and vice versa from the pressure medium through the piston to the piston rod. The pin 43 serves solely for transmitting torque when screwing in the piston head and for engaging the piston head in reverse motion.

The dimensions of the piston 30 and the piston shaft 20 are chosen so that, with the piston inserted, an annular tee-slot or recess for the sealing device 10 is formed by the face section 31 and the piston end of the piston shaft 20 and an exposed part of the piston base 32. The width of the tee-slot (spacing between the surface 35 of the face section 31 that faces the piston shaft and the piston end 24 of the piston shaft 20) is variable because of the axial mobility of the piston head 30. Accordingly, when pressure is applied by the piston head through its motion towards the piston shaft, the sealing device 10 is compressed to produce the required sealing function.

The functioning of the pressure device according to the invention is explained with reference to the expanded view of the piston shaft, sealing device and piston with the means of anchoring device in FIG. 4. The piston pressure device according to the invention (shown without the cylinder) consists of the piston 30, which is linked to the piston shaft 20 for axial movement by the means of anchoring 40, whereby a recess for the sealing device 10 is formed between the face section 31 of the piston 30 and the piston end 24 of the piston shaft 20. In an operating state the compressive force pushes the piston 30 into the hole 22 of the piston shaft 20 at the end of the piston rod 21. Thus the sealing device 10 between the surface 35 of the face section 31, the surface 24 of the piston rod 21, the outer surface of the piston base 32 and the inner wall of the pressure cylinder (not shown) is compressed. This produces a seal all round, whereby compression of the sealing device occurs essentially without its direct contact with the pressure medium. At low compressive force (underpressure or in the normal pressure range or at slight overpressure) sealing is produced by the elastic forces of the elastomer ring 12. According to the invention, these elastic forces are produced by pretensioning of the sealing device 10 in the recess between piston and piston shaft. As described above, the pretensioning is set by screwing in the piston (turning the face section 31 in relation to the piston shaft 20). This rotation is transmitted by the pin 43 to the means of anchoring 40 so that it is screwed by its threaded part 41 into the thread 23 of the piston shaft 21. This reduces the width of the recess formed between piston and piston shaft in which the sealing device is found. The oblong slot 34 extending axially in the piston base 32 enables further reduction of the width of the recess and thus further compression of the sealing device under the influence of compressive force. At the same time the pin 43 is a safeguard against separation of the piston from the piston shaft in reverse motion.

The piston pressure device according to the invention exhibits the following advantages. The seal is gas-tight and fluid-tight. The seal works in wiping fashion through use of the plastically deformable material under pressure so that no fluid film forms between the sealing device and the cylinder. The sealing device is essentially separated from the pressure medium so that use is possible with random fluid samples. The piston pressure device can be miniaturized to enable its use in small, portable high-pressure apparatus. This was not possible to date because of the complicated mechanical structure of conventional sealing components. The occlusion of air or liquid media in the sealing is eliminated so that filling the high-pressure cylinder and venting it present no difficulties. A further advantage is that the means of anchoring 40, working as a sliding joint, ensures that the piston is drawn with the piston shaft when pressure is released. Furthermore, the piston pressure device has no end play. When pressure is released, the piston structure is pressed back, the travel of the piston with the pin 43 serving to overcome frictional forces. The lack of end play is especially important for reproducible, accurate setting of very high pressure along through movement of the piston structure to a predetermined position.

A high-pressure apparatus comprises a piston pressure device according to the invention, a fluid system and a sample space or another control element. The fluid system can, according to the procedure of the invention, be filled in operation of a piston pressure device under normal pressure or even under increased pressure. Evacuation of the fluid system or venting of the sealing is unnecessary. After complete filling, the fluid system is closed tight and the high-pressure apparatus can be put into operation.

The sealing according to the invention can be used to advantage to generate pressure for experiments, technical processes and for production processes and also for low-viscosity fluids. This means that the pressure medium in the pressure vessels and lines can easily be changed or removed (by allowing remaining fluid to vaporize). In contrast to conventional pressure devices with "floating" sealings (with oil film), the invention shows the possibility of stationary pressure creation without the need for repumping.

What is claimed is:

1. A piston pressure device, comprising:

a generally cylindrical piston having a piston face end and a piston base, said piston base being of a smaller diameter than said piston face end;

a piston shaft having a central axis and an end face facing towards said piston face end;

a radially outwardly-opening recess bounded by said piston face end, the outer peripheral surface of said piston base and said piston shaft end face;

said piston base being coupled to said piston shaft such that said piston is axially shiftable in the direction of the piston shaft under the force of a pressure medium acting against the piston face, so that the volume of said recess is variable in response to said pressure medium force;

a sealing device for sealing between spaces of different pressure, said sealing device being arranged form-closed in said recess between said piston and said piston shaft, so that pressure between said piston and piston shaft is exercised through said sealing device;

said sealing device comprising, as a first component, an elastomeric ring and, as a second component, a hollow cylindrical sleeve of a material plastically deformable under pressure, said first and second components ensuring sealing at various pressure differences; and said elastomeric ring having an outer diameter smaller than the outer diameter of said sleeve and being axial-symmetrically embedded in said sleeve so that the elastomeric ring is separated from said piston face end, said piston shaft end face and a cylinder wall to be sealed by said material plastically deformable under pressure.

2. A piston pressure device according to claim 1, in which the sealing device is limited by the surface of the recess between the piston face end and the piston shaft end face and an adjacent inner surface of a cylinder and is only open to the pressure medium through the clearance between the piston and the cylinder.

3. A piston pressure device according to claim 1, in which:

the elastomeric ring is composed of a synthetic rubber; and the material plastically deformable under pressure is polytetrafluorethylene or a tetrafluorethylene copolymer.

4. A piston pressure device according to claim 1, in which the axial width of the recess between the piston and the piston shaft is selected in a balanced state so that the sealing device is subject to pretensioning.

5. A piston pressure device according to claim 4, in which:

the piston is coupled to the piston shaft by a threaded connection; and the axial width of the recess is variable by adjustment of the threaded coupling between the piston and the piston shaft.

* * * * *